Figure 1:
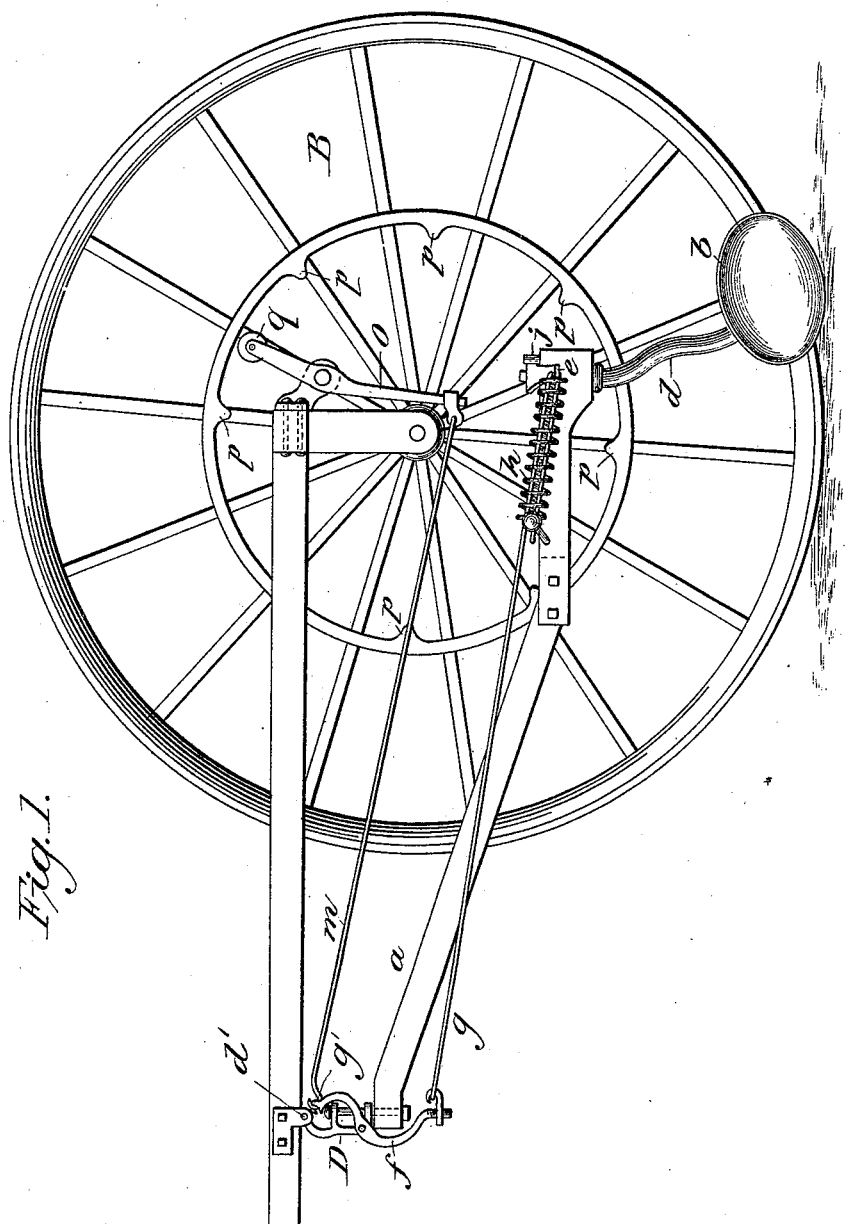

(No Model.) 4 Sheets—Sheet 1.

J. B. HURD & H. H. McLANE.
DISK HOE AND COTTON CHOPPER.

No. 419,586. Patented Jan. 14, 1890.

Witnesses:

Inventor:

(No Model.) 4 Sheets—Sheet 2.
J. B. HURD & H. H. McLANE.
DISK HOE AND COTTON CHOPPER.
No. 419,586. Patented Jan. 14, 1890.
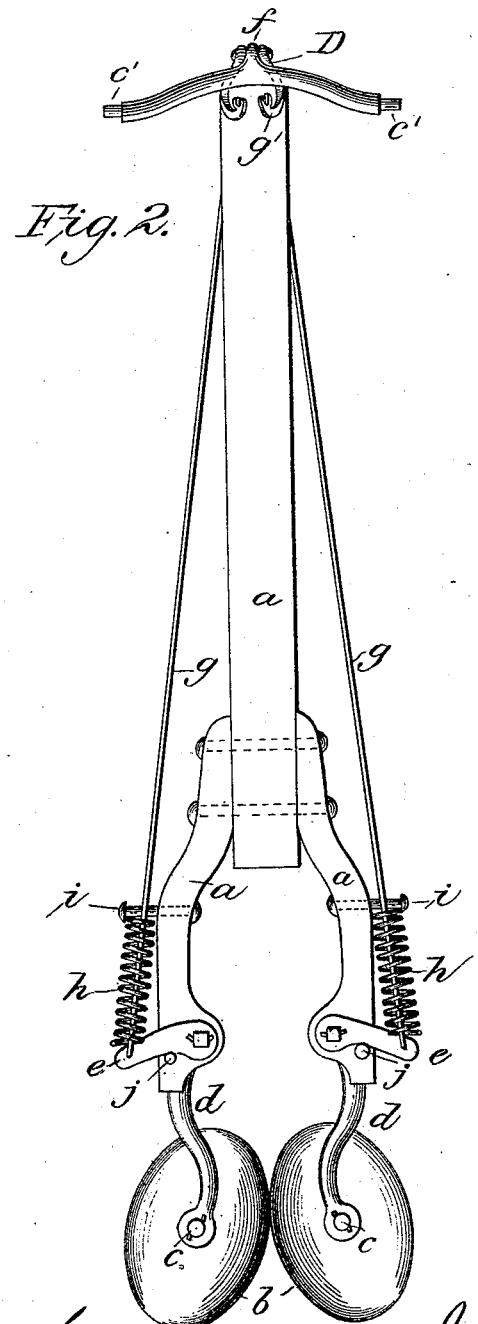

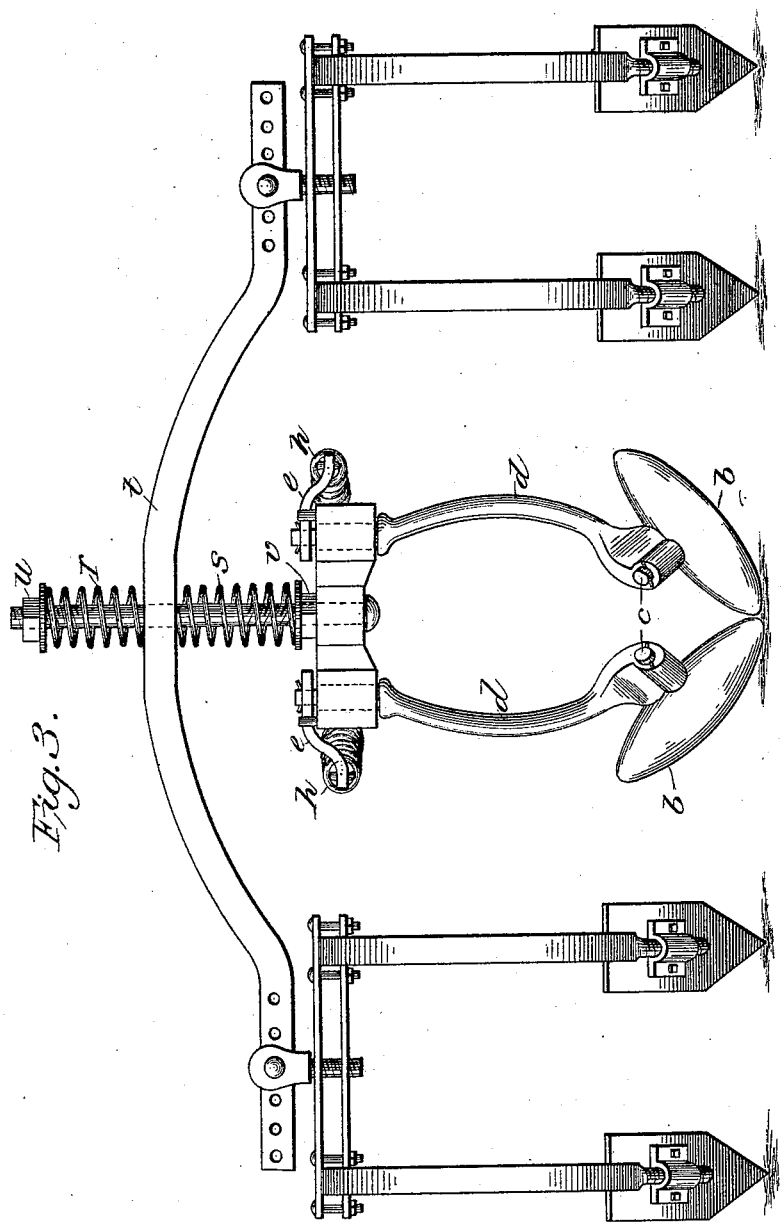

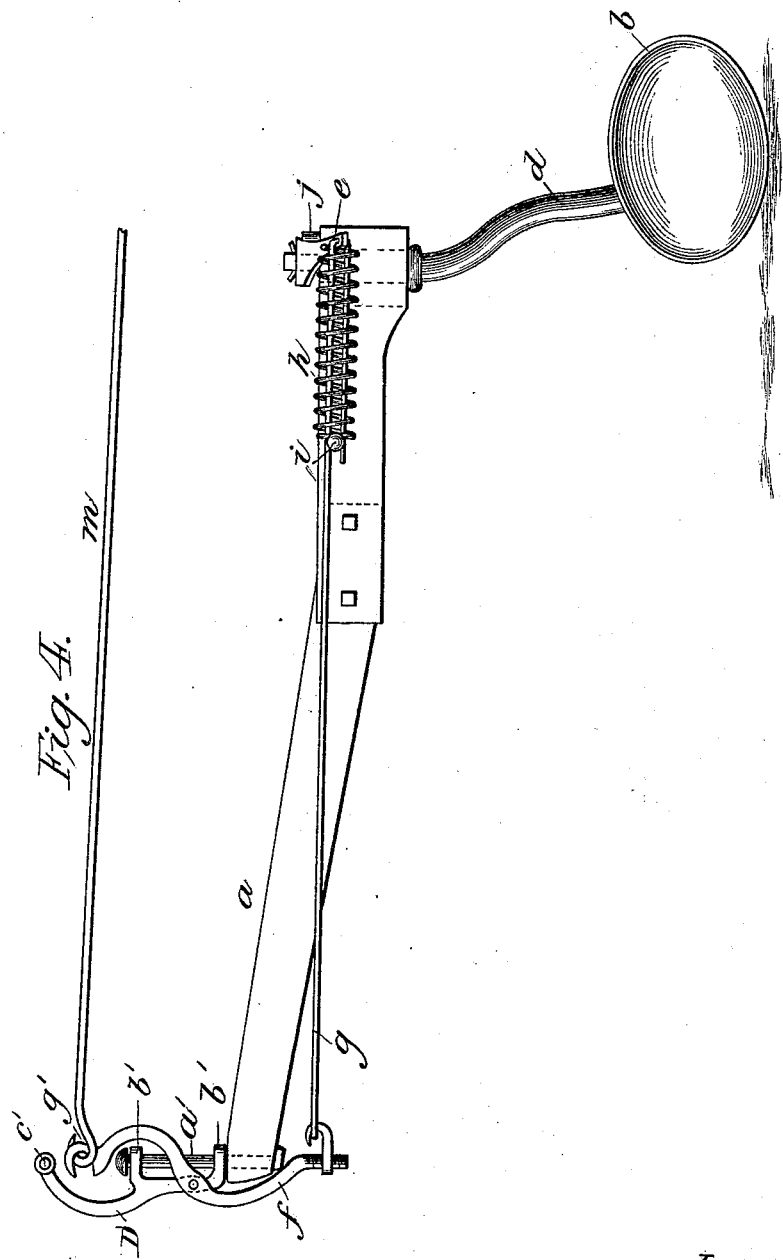

UNITED STATES PATENT OFFICE.

JUDSON B. HURD AND HIRAM H. McLANE, OF SAN ANTONIO, TEXAS.

DISK-HOE AND COTTON-CHOPPER.

SPECIFICATION forming part of Letters Patent No. 419,586, dated January 14, 1890.

Application filed September 12, 1889. Serial No. 323,798. (No model.)

*To all whom it may concern:*

Be it known that we, JUDSON B. HURD and HIRAM H. McLANE, both citizens of the United States, and residents of San Antonio, in the county of Bexar and State of Texas, have invented a new and useful Disk-Hoe and Cotton-Chopper, of which the following is a specification.

Our invention relates to that class of implements that are intended to cultivate or hoe entirely around the plants and thin out the plants in the drill or row; and the objects of our invention are, first, to provide a machine that will adjust itself to the uneven surface of the ground and cut a uniform depth, and while it cultivates very close to the plants will not disturb their roots, cover them up, or bruise them; second, to provide a blade that will do shallow work in loose soil and not clog up or gather and drag along the old grass, roots, or other trash that may be in the way, and, third, to have the whole so simple and so arranged that it may be used as an attachment to an ordinary cultivator or other wheeled implement. The hoeing device, being combined with the running-gear of said implement, forms a complete machine without the necessity of constructing separate wheels, tongue, seat, or other parts to be used for the chopper alone, unless it is so preferred. We attain these objects by the mechanism illustrated in the accompanying drawings, in which—

Figure 1 shows one wheel and the tongue of an ordinary cultivator with our invention attached. Fig. 2 is a top view of the hoeing device. Fig. 3 is a rear view of a portion of an ordinary cultivator and of our hoeing device, showing how they are connected. Fig. 4 is a detached view of the hoeing-frame.

Similar letters refer to similar parts throughout the several views.

Over the row of plants to be hoed we suspend a beam or frame, to which is attached a pair of disks with sharp edges. One face of these disks is concaved, making them in form similar to a tea-saucer. They have their tops leaning out away from each other at an angle of about forty-five degrees from the vertical, and are also set so as to flare behind, or run in toward each other, as shown in Fig. 2. By this position, the sharp edges and concave faces being turned downward and outward, they each cut a furrow and throw the dirt outward from the center, because as they are drawn forward they not only revolve upon their own axles, but drag and scrape somewhat also.

$a$ is the beam or forked frame, and $b\ b$ the cutting-disks. The disks are provided with fixed axles $c\ c$, which project from their upper convex surfaces and revolve in the bearings at the lower end of the crooked shanks $d\ d$. These shanks have a loose vertical bearing in the rear end of the forked frame and terminate at the top with a square end to receive the arms $e\ e$.

In order to allow the hoeing-frame perfect liberty of motion vertically and laterally, and at the same time insure that it remains in the same essential relation to the driving-wheel B, we make use of the joint D and lever $f$, both made especially for this purpose. From the lower end of the lever $f$ extends rods $g\ g$ to each of the arms $e\ e$. Over each of the rods $g\ g$ is placed a spring $h$, which presses with one end against the bolt $i$, which bolt is firm in the frame, and with the other end against the arm $e$. To prevent the arm $e$ from being pressed too far back and the disks from pressing against each other too firmly, a bolt $j$ is vertically extended through the frame behind the arm, and is provided with an eccentric-shaped head at the top end and a nut at the lower end, so that the normal position of the arm may be adjusted and the pressure of the disks against each other be regulated.

The joint D has two axes, one vertical and one lateral. The first is represented by the bolt $a'$, which is firm in the end of the beam $a$, but being allowed to turn in the two ears $b'\ b'$, the frame can swing from right to left, the other axis being formed by the pivots $c'\ c'$. These pivots rest and turn in the eyes $d'\ d'$, which eyes are bolted to the main tongue or pole of the machine, or to the tongue of the cultivator or other implement when our device is used as an attachment to such implement. The axis formed by these pivots allows the hoeing-frame freedom of motion up and down at the rear end. It will be seen that in the joint D there is a point where the two axes cross each other which remains at rest as regards both the hoeing-frame and the driving-wheel. At this point we join the upper end of the lever $f$ with the front end of the rod $m$. This connecting-point is at the two hooks $g'$. The arms $e\,e$ being rigidly fixed to the ends of the shanks $d\,d$, the springs $h\,h$ hold the disks normally together, and also hold the lever $f$ and the rear lever $o$ in position, as shown in Fig. 1; but as the large wheel B revolves and one of the cogs $p$ strikes the end of the lever $o$ and carries it forward this motion is conveyed, by means of the rod $m$, to the lever $f$, and the rods $g\,g$ to the arms $e\,e$. This compresses the springs $h\,h$ and opens the disks $b\,b$ and allows the plant to pass between the disks. When the cog $p$ passes far enough for the end of the lever $o$ to move off of it, the springs $h\,h$ force everything back to the normal position, as represented, and the disks closing in around the plant hoe it on all sides. The position or set of the disks is such that they are inclined to run together as the machine moves forward; but it is preferred to use the springs $h\,h$ also, so as to insure more certainty and promptness in their movement. The upper end of the lever $o$ is provided with a roller $q$, to save friction and the wear of parts. Cogs may be used in the place of this roller, and instead of one separate cog in a place on the wheel B, as here shown, a series of cogs may be used. So, also, other methods may be used for operating the disks and other forms for constructing the various parts, if only the distinguishing characteristics remain the same.

When our hoeing-frame is used as an attachment to another implement, or when completed as a machine by itself, it may be desirable to use in connection with it some of the ordinary blades for cultivating between the rows. In that case the cultivating-frames may be connected to the hoeing-frame, as shown in Fig. 3 of the drawings. In this view is also shown the springs $r$ and $s$, which are on either side of the connecting-arch $t$, and are used for the purpose of throwing more weight on the hoeing-frame when the soil is hard, or for removing some of the weight when the soil is mellow. This is done by manipulating the nuts $u$ and $v$.

We are aware that cutting-disks are used for the cultivation of field-plants; but our disks are set so as to allow the broad top of cotton or other plants to pass between them without injury when they are thrown open, but so as to cut off the roots of everything as they pass along together.

Having thus described our invention, we claim as new and desire to secure by Letters Patent—

1. In a cotton-chopper, the combination, with the frame, the driving-wheel having the cogged rim, and the lever $o$, of the rods $g\,m$, the joint-piece D, lever $f$, the forked bar $a$, the pivoted shanks $d$, with arms $e$, springs $h$, and the oblique cutting-disks $b$, whereby the disks are thrown apart at intervals to allow a plant to pass between them, substantially as shown and described.

2. In a cotton-chopper, two cutting-disks having crank-shanks or standards, the disks set obliquely, one on each side of a row of plants, their lower edges meeting, and arranged to cut out the row and hoe between the stands or plants to be saved, in combination with a cogged driving-wheel and mechanism for throwing said disks apart at intervals and causing them to hoe entirely around the hills or plants saved, substantially as shown and described.

3. In a disk-hoe and cotton-chopper, the frame $a$, the disks $b\,b$, shanks $d\,d$, arms $e\,e$, springs $h\,h$, $r$, and $s$, arch $t$, nuts $u$ and $v$, hinge D, lever $f$, rods $m$ and $g$, in combination with wheel B, cogs $p$, and lever $o$, substantially as shown and described, and for the purpose specified.

JUDSON B. HURD.
HIRAM H. McLANE.

Witnesses:
H. C. HURD,
ELLEN M. C. NICHOLS.